United States Patent Office 3,102,863
Patented Sept. 3, 1963

3,102,863
LUBRICATING COMPOSITIONS
Stephen A. Herbert, Jr., Martinez, and Harry F. Richards, Concord, Calif., assignors to Shell Oil Company, a corporation of Delaware
No Drawing. Filed June 15, 1959, Ser. No. 820,087
9 Claims. (Cl. 252—46.7)

This invention relates to improved lubricants, and particularly to engine hydrocarbon lubricants having improved detergency, viscosity index, wear inhibition, as well as enhanced oxidation and corrosion inhibition properties and to new and improved oil additives therefor.

Until recently, lubricants were commonly doped with various oil-soluble metal salts such as polyvalent metal sulfonates, carboxylates, phenates, phosphates, thiocarbamates, and the like. Some of these substances, such as the sulfonates, phenates and carboxylates possess detergent properties, some such as phenates and thiocarbamates are useful because of their corrosion inhibiting properties and some such as the phosphates are useful as anti-oxidants. In general, these metallic compounds, when subjected to high temperature and high pressure conditions, breakdown and even act as pro-oxidants, causing deterioration of the oil base resulting in corrosivity, pro-wear, etc. Recently certain non-ash forming oxygen and/or nitrogen-containing polymeric additives have been introduced as oil additives, but these generally lack wear inhibiting and extreme pressure as well as high temperature oxidation inhibiting properties. Attempts to impart these properties to oil containing non-ash forming polymeric detergents by addition of conventional anti-wear and extreme pressure agents have been unsuccessful since such combinations generally tend to form complexes resulting in sludge and deposit formations.

It has now been found that liquid hydrocarbon compositions are improved with respect to viscosity index, detergency, oxidation, corrosion, and wear inhibition by a novel class of polymers, namely an oil-soluble polymeric compound having essentially a long linear hydrocarbon backbone chain and attached thereto in a uniform or random fashion two essential polar-containing groups, one being a sulfur-free ester group represented by —COOR, wherein R is a $C_{8-18}$ alkyl radical and the other polar group being a sulfur-containing ester group represented by —COOR'—XR" wherein the R' and R" are the same or different $C_{2-18}$ alkyl radicals and X is a sulfur-containing divalent radical selected from sulfide, sulfinyl (SO) or sulfonyl ($SO_2$) radical. Polymeric compounds of this type should have a plurality of at least 8 units selected from

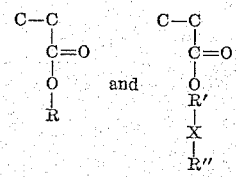

at least two of each, and wherein the R's and X are as defined above and the number of units is such that the molecular weight of the polymer ranges from about 5000 to 1,000,000, preferably from about 25,000 to 500,000.

The polymeric compounds used in compositions of the present invention are readily prepared by various means such as by copolymerizing in the presence of a suitable catalyst such as an azo catalyst such as alpha,alpha'-azo-di-isobutyronitrile, esters of long chain alkanols, such as lauryl alcohol and unsaturated acids such as acrylic or methacrylic acids e.g., a $C_{10-18}$ ester of an acrylic acid with an acrylic acid ester of a sulfur-containing alkanol such as a thia or sulfinyl or sulfonyl-containing alkanol.

The sulfur-containing alkanols are readily prepared by methods well known in the art such as described in U.S. Patents 2,460,436, 2,570,050, 2,570,051 and 2,812,267. The esters of such sulfur-containing alcohols are prepared by reacting a sulfur-containing alcohol with an acrylyl halide such as methacrylyl chloride in the presence of a suitable base such as pyridine or by trans-esterification of an acrylate ester such as methyl or ethyl methacrylate with a sulfur-containing alcohol using an acid catalyst such as para toluene sulfonic acid.

Specifically, the sulfur-free polymerizable ester monomer is an ester of an acrylic acid, generally containing from 3 to 9 carbon atoms in the acrylate radical, preferably from 3 to 4, being the unsubstituted acrylate and the alpha-methacrylate radicals. Other alpha-substituted acrylate radicals are exemplified by alpha-ethylacrylate and alpha-phenylacrylate. The alcohol used to form the ester is preferably a primary alcohol, although secondary and tertiary alcohols are suitable, containing at least 9 carbon atoms, preferably from 12 to 20, and preferably having a chain of at least 5 carbon atoms. Representative suitable alcohols are: n-octyl, n-lauryl, n-cetyl, n-stearyl, n-oleyl, 2,2,4,4-tetramethylpentyl and 2,2,4,4,6,6-hexamethylheptyl alcohols. Examples of the esters are n-nonyl acrylate, n-lauryl acrylate, n-stearyl acrylate, n-nonyl methacrylate, n-lauryl methacrylate, n-cetyl methacrylate, n-stearyl methacrylate, 2-ethylhexyl methacrylate, 2,2,4,4-tetramethyl lauryl methacrylate, and their mixtures.

The other polymerizable monomer is an acrylic acid ester of a sulfur-containing alcohol such as a thia, sulfinyl or sulfonyl containing alcohol, such as propyl, butyl, amyl, hexyl, octyl, stearyl thiaethanol, thiapropanol, thiabutanol, thiaoctanol, thiadecanol, etc. or the corresponding sulfine or sulfone derivatives. Examples of such sulfur-containing esters are 2-thiaamyl acrylate, 2-thiaamyl methacrylate, 2-thiaoctyl acrylate, 2-thiaoctyl methacrylate, 3-thia butyl methacrylate, 3-thiaoctyl methacrylate, 3-thiadodecyl methacrylate, 4-thiaoctyl methacrylate, 5-thiastearyl methacrylate, 2-sulfinyloctyl methacrylate, 2-sulfonyl octyl acrylate, 2-sulfonyloctyl methacrylate, 3-sulfonyloctyl methacrylate, 4-sulfonyloctyl methacrylate, 3-sulfonyldodecyl methacrylate and mixtures thereof.

The copolymers are prepared by polymerizing the two monomers in the mol ratio of 1:10 to 10:1, preferably 1:3 to 5:1 of the sulfur-free acrylate ester to the sulfur-containing acrylate ester, respectively. The reaction is carried out in the presence of a polymerization initiator such as an azo catalyst, in an inert solvent and at a temperature ranging from about 60° to about 150° C., preferably between 80° and 100° C. for a period of from 2 to 48 hours, preferably from 8 to 35 hours so that the sulfur content of the final product ranges from about 1% to about 15%, preferably between 2 and 10% by weight. The solvents are light liquid hydrocarbons such as benzene, xylene, toluene, light mineral oil, etc.

Various combinations of conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, and nature and amount of the particular monomers. When the polymerization is accomplished in solution, the molecular weight of the product will be lower when the dilution is higher, e.g., when the proportion of solvent is greater. With the same catalyst, the higher polymerization temperature tends to give lower molecular weight polymers.

The following examples illustrate the preparation of suitable polymers for use in oil compositions in accordance with the invention.

EXAMPLE I

A mixture of about 1 mol of stearyl methacrylate, 1 mol of 4-thiaoctyl methacrylate and 0.1% alpha,alpha'-azodiisobutyronitrile was reacted in a benzene solution for a period of about 32 hours at about 80° C. The polymer was dispersed in a benzene-alcohol mixture and then isolated therefrom by a precipitation technique. A copolymer of stearyl methacrylate/4-thiaoctyl methacrylate having a sulfur content of 10% and a molecular weight in excess of 62,000 was recovered. It had good solubility in mineral lubricating oils and imparted thereto detergent and wear-inhibiting properties.

EXAMPLE II

A copolymer of stearyl methacrylate and 4-thiaoctacyl methacrylate was prepared by the method of Example I except that the ratio of the reactant monomers was 2 to 1, respectively. The molecular weight of the copolymer was around 42,000, it had a sulfur content of 3% and was oil-soluble and exhibited good detergent and wear-inhibiting properties.

EXAMPLE III

A copolymer of stearyl methacrylate and 4-sulfonyl octyl methacrylate was prepared by the method of Example I in which the ratios of the reactants and conditions of the reaction were the same as described in Example I. The polymeric product had a molecular weight of 24,000, a sulfur content of 4% and was oil-soluble and exhibited good detergent and wear-inhibiting properties.

EXAMPLE IV

A copolymer of lauryl methacrylate and 5-thiadodecyl methacrylate in the mol ratio of 1:1 was prepared by the procedure of Example I except that the reaction temperature was 100° C. The copolymer was oil-soluble and the molecular weight was around 50,000.

Other representative copolymers useful in lubricating compositions of this invention include those identified below in which the monomeric units are present in the mol ratios of 1:1, 1:2, 1:4, 1:5, of the monomer, one to the other, and preferably of the sulfur-free ester to the sulfur-containing ester, respectively, said copolymers having a molecular weight in excess of 25,000: 5-thiastearyl methacrylate/octyl methacrylate, 3 - thiadecyl methacrylate/cetyl methacrylate, 3-sulfonyl octyl methacrylate/stearyl methacrylate, 4-sulfonyl octyl methacrylate/stearyl acrylate, 2-thiaoctyl acrylate/lauryl methacrylate, and mixtures thereof.

The above copolymers can be modified by copolymerizing the two essential monomers with one or more other polymerizable monomers such as long-chain alpha-olefins, e.g., α-octadecene or α-dodecene or polar-containing polymerizable monomers such as: halo- or amino- or hydroxyalkyl acrylates or methacrylates, e.g., aminoethyl methacrylate, di-ethylaminoethyl methacrylate; hydroxyethyl methacrylate; 2-chloroethyl methacrylate; vinyl phosphates such as bis-2-chloroethyl vinyl phosphonate; allyl phosphates such as trimethallyl phosphate, and mixtures thereof. When using these modifiers they are generally used in equal molar amounts relative to the sulfur-containing acrylate ester. Examples of terpolymers include (a) stearyl methacrylate/4-thiaoctyl methacrylate/2-chloroethyl methacrylate (1:1:1), with a mol. wt. of 24,000 and 8% sulfur content (b) stearyl methacrylate/4-thiaoctyl methacrylate/bis-chloroethyl vinyl phosphonate (1:1:1) with a mol. wt. of 18,000, and 6.5% sulfur content (c) stearyl methacrylate/4-thiaoctyl methacrylate/trimethallyl phosphate (1:1:1) having a mol. wt. of 38,000 and 10% sulfur content (d) lauryl methacrylate/4-sulfonyl octyl methacrylate/hydroxyethyl methacrylate 2:1:1), (e) stearyl methacrylate/4-thiaoctyl methacrylate/hydroxyethyl methacrylate (2:1:1).

When desired, additional improvements with respect to oxidation stability and scuffing inhibition can be imparted to the oil compositions containing the copolymers of this invention by incorporating small amounts (0.01–2%, preferably 0.1–1%) of phenolic antioxidants such a alkylphenol, e.g., 2,6-ditertbutyl-4-methyl phenol or p,p'-methylene bisphenols such as 4,4'-methylene (2,6-ditertbutyl phenol) or arylamines such as phenyl-α-naphthylamine and mixtures thereof. Anti-scuffing agents include organic phosphites, phosphates, phosphonates and their thio-derivatives, such as $C_{3-18}$ alkyl phosphites, or phosphonates, e.g., di- and tributyl, octyl, lauryl, stearyl, cyclohexyl, benzyl, cresyl, phenyl, phosphites or phosphates, as well as their thio-derivatives, $P_2S_5$-terpene reaction products, e.g., $P_2S_5$-pine oil reaction product and alkali metal salts thereof such as a potassium salt of a $P_2S_5$-terpene reaction product, phosphonates such as dibutyl methanephosphonate, dibutyl trichloromethanephosphonate, dibutyl monochloromethanephosphonate, dibutyl chlorobezenephosphonate, and the like. The full esters of pentavalent phosphorus acids such as triphenyl, tricresyl, trilauryl and tristearyl ortho phosphates or potassium salt of $P_2S_5$-terpene reaction product are preferred.

The sulfur-containing polymeric additives of this invention improve various petroleum products by the incorporation of a minor amount (0.001% to 10%, preferably 0.1% to 5% by weight) of the additive. Thus, they may be used to improve gasoline, jet fuels, transformer oils, turbine oils, mineral lubricating oils, industrial oils such as hydraulic fluids, metal working fluids and quenching fluids. The sulfur-containing polymers are particularly useful in refined mineral lubricating oils, which may range from SAE 5W viscosity grade to SAE 140 grade and which may be derived from paraffinic, naphthenic or asphaltic base crudes. Representative oils are refined high viscosity index mineral oils having a viscosity of 100° F. of 100 to 250 SUS. A typical mineral lubricating oil (X) of this type had the following properties:

| | |
|---|---|
| Gr., °API, 60/60 ° F | 32 |
| Flash, ° F | 370 |
| Viscosity index (Dean and Davis) | 93 |
| Viscosity, SUS at 100 ° F | 103 |

The following non-ash compositions are representative of this invention:

Composition A:
    Example I copolymer _____ 2% wt.
    Mineral lubricating oil (X) _____ Balance.
Composition B:
    Example (a) terpolymer _____ 2% wt.
    Mineral lubricating oil (X) _____ Balance.
Composition C:
    Example III copolymer _____ 2% wt.
    Mineral lubricating oil (X) _____ Balance.
Composition D:
    Example (b) terpolymer _____ 2% wt.
    Mineral lubricating oil (X) _____ Balance.
Composition E:
    Example (c) terpolymer _____ 2% wt.
    Mineral lubricating oil (X) _____ Balance.
Composition F:
    Example I copolymer _____ 3% wt.
    4,4'-methylene bis(2,6-ditertbutylphenol)__ 1% wt.
    Mineral lubricating oil (SAE 30) _____ Balance.
Composition G:
    Example I copolymer _____ 5% wt.
    4,4'-methylene bis(2,6-ditertbutylphenol) _____ 0.5% wt.
    Tricresyl phosphate _____ 0.8% wt.
    Mineral lubricating oil (X) _____ Balance.

Composition H:
    Example I copolymer _____ 5% wt.
    4,4'-methylene bis(2,6-ditertbutyl-
        phenol) _____ 0.5% wt.
    $P_2S_5$-terpene reaction product _____ 1% wt.
    Mineral lubricating oil (X) _____ Balance.

Composition I:
    Example I copolymer _____ 2% wt.
    Fuel oil (No. 2) _____ Balance.

To illustrate the superior and unexpected results obtained with compositions of the present invention, the following compositions were tested for the following properties: (1) VI (viscosities at 100° F. and 210° F.) and (2) corrosion inhibition as determined by the Cu Strip Corrosion Test (ASTM procedures); (3) extreme pressure (Hertz mean load, kg.); (4) engine test—Oldsmobile Engine Scuffing Test under the following test conditions: 2400 r.p.m., crankcase oil temperature—200° F., with the results as shown in Table I.

Table I

| Composition | VI | Mean Hertz load, kg. | Copper strip corrosion | Oldsmobile scuffing test, mean wear 1/1,000 in— | | Visual lifter rating |
| --- | --- | --- | --- | --- | --- | --- |
| | | | | Cam | Lifters | |
| A | 120 | 23 | 1A | 0.7 | 0.5 | 7 |
| B | 115 | 25.8 | 1A | | | |
| C | 118 | 20.5 | 1A | 0.8 | 0.5 | 8.5 |
| D | 112 | 24.3 | 1B | | | |
| E | 114 | 21 | 1A | 0.9 | 1 | 7 |
| Mineral Oil | 93 | 14 | 1A | Catastrophic wear >100 | | 0 |

Lubricating compositions of this invention are particularly applicable for high temperature, high speed use as in aviation engines, automotive engines, truck engines as well as industrial equipment.

We claim as our invention:

1. An improved mineral oil composition comprising a major amount of mineral oil and from about 0.1% to 10% by weight of a copolymer of an acrylate ester of an acrylic acid selected from the group consisting of acrylic acid and methacrylic acid and a $C_{8-18}$ alkanol and a sulfur-containing acrylate ester having the formula

wherein R' and R'' are $C_{2-18}$ alkyl radicals, R''' is selected from the group consisting of hydrogen and a methyl radical and X is selected from the group consisting of S, SO and $SO_2$ radicals, in the mol ratio of from 1:10 to 10:1, respectively, said copolymer having a molecular weight of from about 5000 to about 1,000,000.

2. An improved mineral oil composition comprising a major amount of mineral oil and from about 0.1% to about 10% of a copolymer of an ester of methacrylic acid and a $C_{8-18}$ alkanol and a thia $C_{3-18}$ methacrylate, in the mol ratio of from 1:10 to 10:1, respectively, said copolymer having a molecular weight of from about 5000 to about 1,000,000.

3. An improved mineral oil composition comprising a major amount of mineral oil and from about 0.1% to about 10% of a copolymer of an ester of methacrylic acid and a $C_{8-18}$ alkanol and a sulfonyl $C_{3-18}$ methacrylate, in the mol ratio of from 1:10 to 10:1, respectively, said copolymer having a molecular weight of from about 5000 to about 1,000,000.

4. An improved mineral lubricating oil composition comprising a major amount of mineral oil and from about 0.1% to 10% of a copolymer of stearyl methacrylate and 4-thiaoctyl methacrylate in the mol ratio of from 1:3 to 5:1, respectively, and having a molecular weight of from about 25,000 to about 500,000.

5. An improved mineral lubricating oil composition comprising a major amount of mineral oil and from about 0.1% to 10% of a copolymer of stearyl methacrylate and 4-sulfonyloctyl methacrylate in the mol ratio of from 1:3 to 5:1. respectively, and having a molecular weight of from about 25,000 to about 500,000.

6. An improved mineral lubricating oil composition comprising a major amount of mineral oil and from about 0.1% to 10% of a terpolymer of stearyl methacrylate/4-thiaoctyl methacrylate/bis-chloroethyl vinyl phosphonate having a molecular weight of from about 25,000 to about 500,000 in the mol ratio of 1:1:1, respectively, and having a molecular weight of from about 25,000 to about 500,000.

7. An improved mineral lubricating oil composition comprising a major amount of mineral oil and from about 0.1% to 10% of a terpolymer of stearyl methacrylate/4-thiaoctyl methacrylate/2-chloroethyl methacrylate having a molecular weight of from about 25,000 to about 500,000 in the mol ratio of 1:1:1, respectively, and having a molecular weight of from about 25,000 to about 500,000.

8. The mineral oil composition of claim 1 containing from about 0.01% to about 2% each of a methylene bis(dialkylphenol) and a monoaryl selected from the group consisting of di- and triphenyl and di- and tricresyl phosphates.

9. The mineral oil composition of claim 4 containing from about 0.01% to about 2% each 4,4'-methylene bis(2,6-ditertbutyl phenol) and tricresyl phosphate.

References Cited in the file of this patent
UNITED STATES PATENTS

| | | |
| --- | --- | --- |
| 2,475,246 | Mikeska | July 5, 1949 |
| 2,478,038 | Burke | Aug. 2, 1949 |
| 2,538,696 | May | Jan. 16, 1951 |
| 2,684,334 | Ryan et al. | July 20, 1954 |
| 2,800,450 | Bondi et al. | July 23, 1957 |
| 2,841,244 | Sorem | July 1, 1958 |
| 2,877,214 | Opheim et al. | Mar. 10, 1959 |
| 2,901,458 | Banes et al. | Aug. 25, 1959 |
| 2,925,406 | McCurdy et al. | Feb. 16, 1960 |

FOREIGN PATENTS

| | | |
| --- | --- | --- |
| 717,591 | Great Britain | Oct. 27, 1954 |